(12) United States Patent
Longmeyer

(10) Patent No.: US 8,955,610 B1
(45) Date of Patent: Feb. 17, 2015

(54) TURF AERATORS AND TINE ASSEMBLIES FOR SAME

(71) Applicant: Billy Goat Industries, Inc., Lee's Summit, MO (US)

(72) Inventor: Stephen Eugene Longmeyer, Pleasant Hill, MO (US)

(73) Assignee: Billy Goat Industries, Inc., Lee's Summit, MO (US)

( * ) Notice: Subject to any disclaimer, the term of this patent is extended or adjusted under 35 U.S.C. 154(b) by 173 days.

(21) Appl. No.: 13/836,793

(22) Filed: Mar. 15, 2013

(51) Int. Cl.
*A01B 45/00* (2006.01)
*A01B 45/02* (2006.01)

(52) U.S. Cl.
CPC .................................. *A01B 45/023* (2013.01)
USPC ........................................... 172/21; 172/125

(58) Field of Classification Search
CPC ....... A01B 45/00; A01B 45/02; A01B 45/023
USPC .............................................. 172/21, 22, 125
See application file for complete search history.

(56) References Cited

U.S. PATENT DOCUMENTS

| | | | |
|---|---|---|---|
| 4,422,510 A | | 12/1983 | de Ridder |
| 4,602,687 A | * | 7/1986 | Hansen ........................... 172/22 |
| 4,645,012 A | * | 2/1987 | Hansen et al. ................... 172/22 |
| 4,750,565 A | * | 6/1988 | Hansen et al. ................... 172/22 |
| 4,753,298 A | * | 6/1988 | Hansen et al. ................... 172/22 |
| 4,867,244 A | | 9/1989 | Cozine et al. |
| 5,570,746 A | | 11/1996 | Jones et al. |
| 6,003,613 A | | 12/1999 | Reincke |
| 6,199,637 B1 | | 3/2001 | Wiedenmann |
| 7,096,969 B2 | * | 8/2006 | Petersen et al. .................. 172/22 |
| 7,293,612 B1 | * | 11/2007 | Petersen et al. .................. 172/22 |
| 7,472,759 B2 | * | 1/2009 | Petersen ........................... 172/22 |
| 7,669,667 B2 | * | 3/2010 | Petersen et al. .................. 172/22 |
| 8,291,991 B1 | * | 10/2012 | Cook ............................... 172/21 |
| 8,800,677 B2 | * | 8/2014 | Georgoulias et al. ............. 172/2 |
| 8,844,645 B2 | * | 9/2014 | Hall et al. ........................ 172/21 |
| 2002/0043376 A1 | * | 4/2002 | Smith ............................. 172/21 |

(Continued)

FOREIGN PATENT DOCUMENTS

GB      661287 A1     11/1951

OTHER PUBLICATIONS

David Bradley, Basic Electrical Power and Machines, 1994, 185-86, Chapman & Hall, London, United Kingdom.

*Primary Examiner* — Jamie L McGowan
(74) *Attorney, Agent, or Firm* — Lathrop & Gage LLP

(57) ABSTRACT

In one embodiment, a turf aerator includes a frame having wheels, a variable displacement pump, an engine for driving at least one of the wheels and driving the pump, a tine assembly supported by the frame and being movable between lowered and raised configurations, and a swash-plate-adjustment linkage extending from the tine assembly to the pump. The tine assembly includes: a base; a hydraulic motor in hydraulic communication with the pump; rotatable cranks powered by the hydraulic motor; a downwardly-extending arm rotatably coupled to each crank; a tine extending downwardly from each downwardly-extending arm; springs operatively anchored to the base; and a guide arm extending between each downwardly-extending arm and a respective spring. The swash-plate-adjustment linkage automatically adjusts the pump with movement of the tine assembly relative to the frame to provide output to the hydraulic motor substantially only when the tine assembly is at the lowered configuration.

15 Claims, 17 Drawing Sheets

(56) References Cited

U.S. PATENT DOCUMENTS

| | | |
|---|---|---|
| 2008/0149357 A1* | 6/2008 | Classen et al. ............... 172/21 |
| 2009/0166048 A1 | 7/2009 | Wiedenmann |
| 2011/0042113 A1 | 2/2011 | de Bree |
| 2011/0213530 A1* | 9/2011 | Hunt et al. ..................... 701/50 |
| 2012/0012351 A1 | 1/2012 | de Bree |
| 2013/0255979 A1* | 10/2013 | Georgoulias et al. ........... 172/22 |

* cited by examiner

TURF AERATORS AND TINE ASSEMBLIES FOR SAME

BACKGROUND

Aerators are commonly used to improve turf quality by driving sets of coring tines into the ground to remove soil (often in cylindrical portions referred to as "plugs"). This counteracts soil compaction by creating cavities that permit water and other nutrients to better reach the roots of the remaining grass, and thereby promotes the overall health of the turf.

A traditional prior art aerator is shown and described in U.S. Pat. No. 4,867,244 to Cozine, the contents of which are incorporated herein in its entirety by reference. In Cozine ('244), an engine 24 powers drive wheels 18 for forward movement and also simultaneously powers a crankshaft 96 to rotate in the same direction as the wheels. The crankshaft in turn (through cranks 98 and arms 100) causes coring tines 30 to enter the ground while pointing toward the rear wheels and then exit the ground while pointing toward the front wheels, such that the tines become angled more toward the front of the machine as they are withdrawn from the ground. Cranks 138, 140 are coupled to the respective arms 100 by links 142, 144 and engage stops 148 with every insert-withdraw cycle of a respective tine. Cozine ('244) discloses that such stop members are an important feature that accurately positions the tines and prevents turf damage.

Embodiments of the current invention advance the aerator art.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

In one embodiment, a turf aerator includes a frame having a plurality of wheels, a variable displacement pump, an engine for driving at least one of the wheels and driving the pump, a tine assembly, and a swash-plate-adjustment linkage. The tine assembly is supported by the frame and is movable relative to the frame between lowered and raised configurations. The tine assembly includes: (a) a base; (b) a hydraulic motor in hydraulic communication with the pump; (c) a plurality of rotatable cranks; (d) structure for transferring rotational motion from the hydraulic motor to the cranks; (e) a downwardly-extending arm rotatably coupled to each crank; (f) a tine extending downwardly from each downwardly-extending arm; (g) a plurality of springs operatively anchored to the base; and (h) a guide arm extending between each downwardly-extending arm and a respective spring. The swash-plate-adjustment linkage extends from the tine assembly to the pump, and the swash-plate-adjustment linkage automatically adjusts the pump with movement of the tine assembly relative to the frame to provide output to the hydraulic motor substantially only when the tine assembly is at the lowered configuration.

In another embodiment, a turf aerator includes a frame having a plurality of wheels, a variable displacement pump, apparatus for outputting a rotation to drive at least one of the wheels and drive the pump, a tine assembly, and a swash-plate-adjustment linkage extending from the tine assembly to the pump. The tine assembly is supported by the frame and is movable relative to the frame between lowered and raised configurations. The tine assembly includes: (a) a base; (b) a hydraulic motor in hydraulic communication with the pump; (c) a plurality of rotatable cranks; (d) structure for transferring rotational motion from the hydraulic motor to the cranks; (e) a downwardly-extending arm rotatably coupled to each crank; and (f) a tine extending downwardly from each downwardly-extending arm. The swash-plate-adjustment linkage automatically adjusts the pump with movement of the tine assembly relative to the frame to provide output to the hydraulic motor substantially only when the tine assembly is at the lowered configuration, whereby movement of the tine assembly from the lowered configuration to the raised configuration causes the rotatable cranks to stop rotating without further user input.

In still another embodiment, a tine assembly for a turf aerator includes a base, a plurality of rotatable cranks, a downwardly-extending arm rotatably coupled to each crank, a tine extending downwardly from each downwardly-extending arm, a plurality of springs operatively anchored to the base, and a guide arm extending between each downwardly-extending arm and a respective spring.

DETAILED DESCRIPTION

Figure 1:
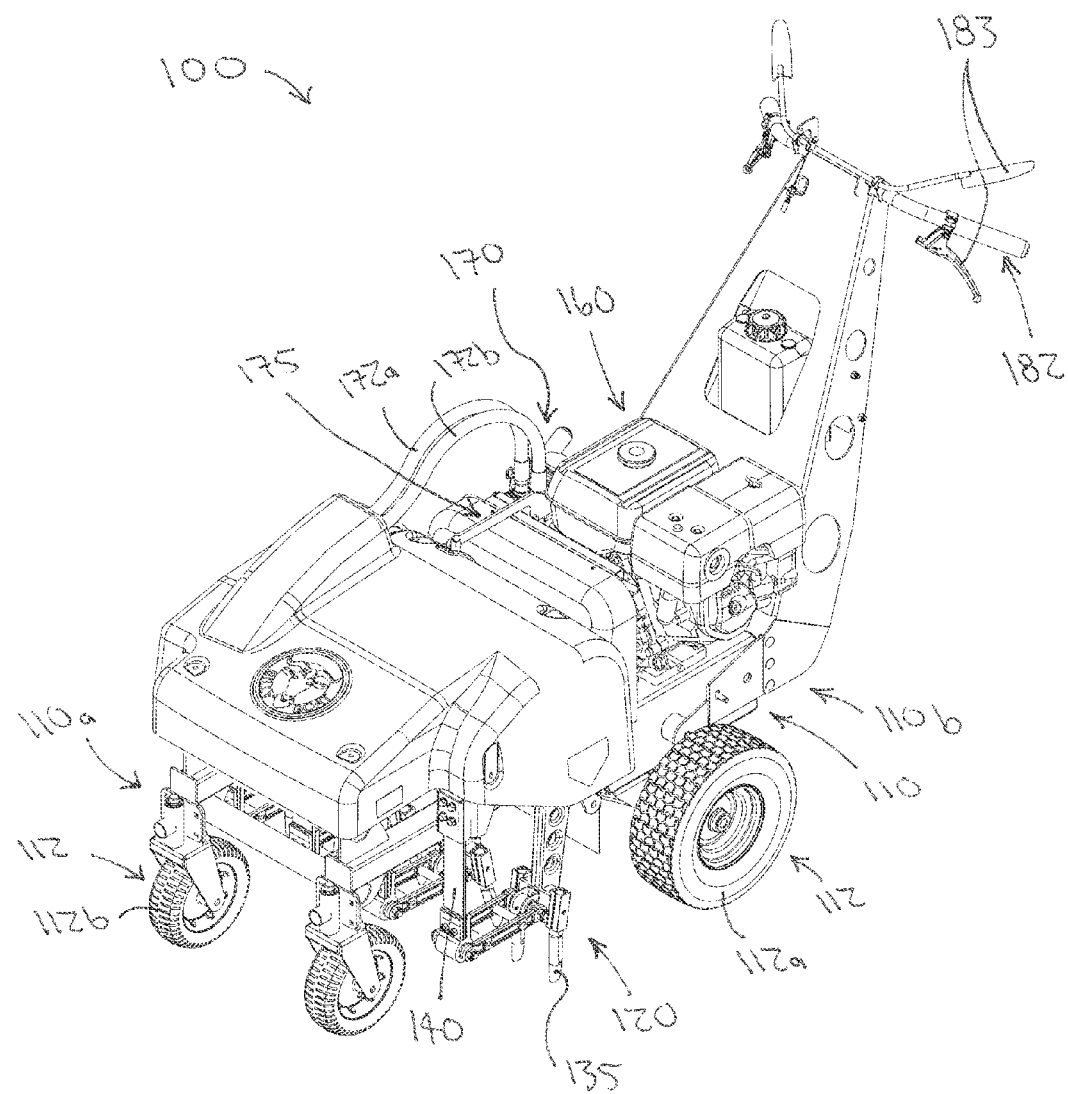
FIG. 1 is a perspective view of an aerator according to one embodiment of the current invention.
Figure 2:
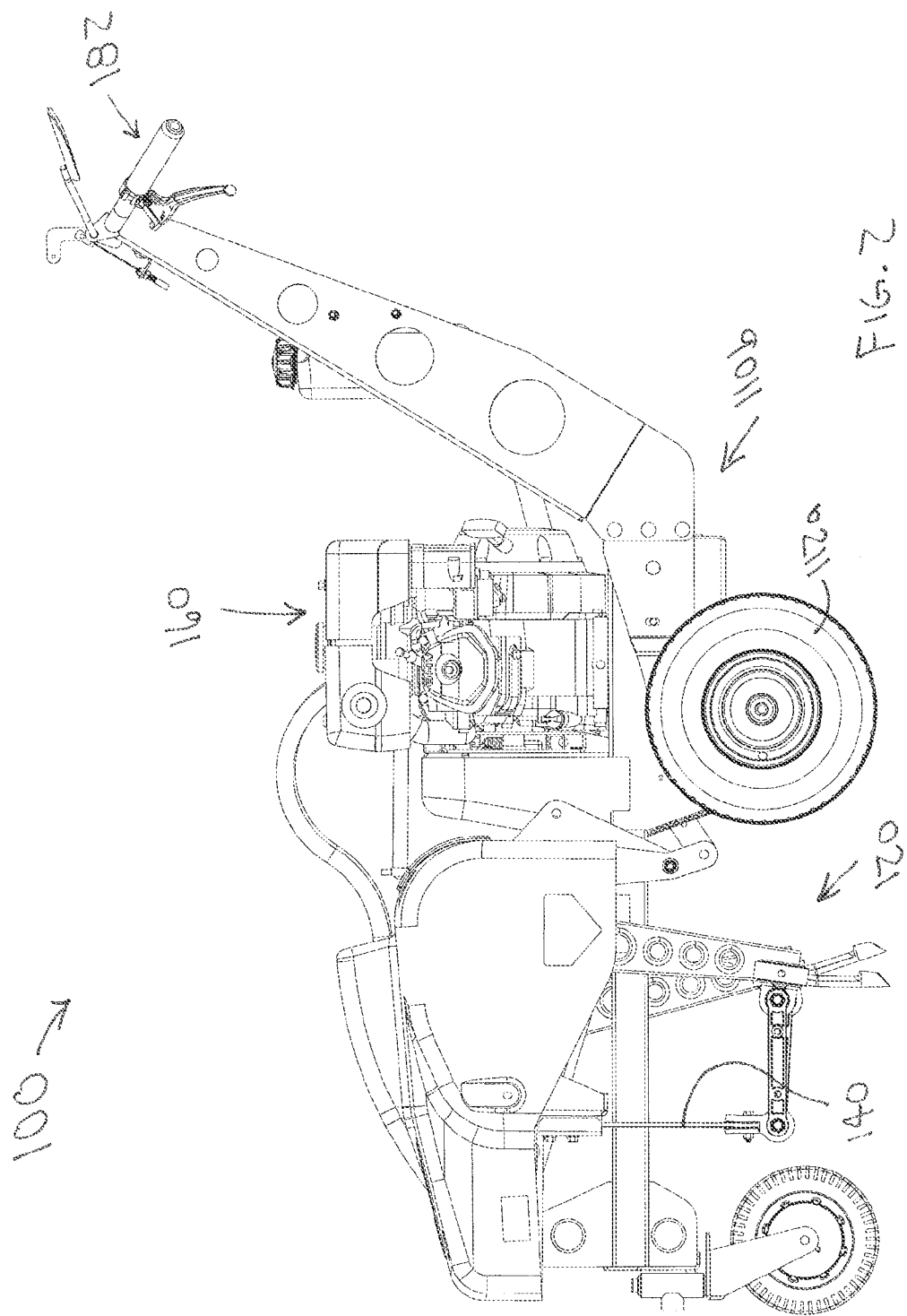
FIG. 2 is a side view of the aerator of FIG. 1.
Figure 3:
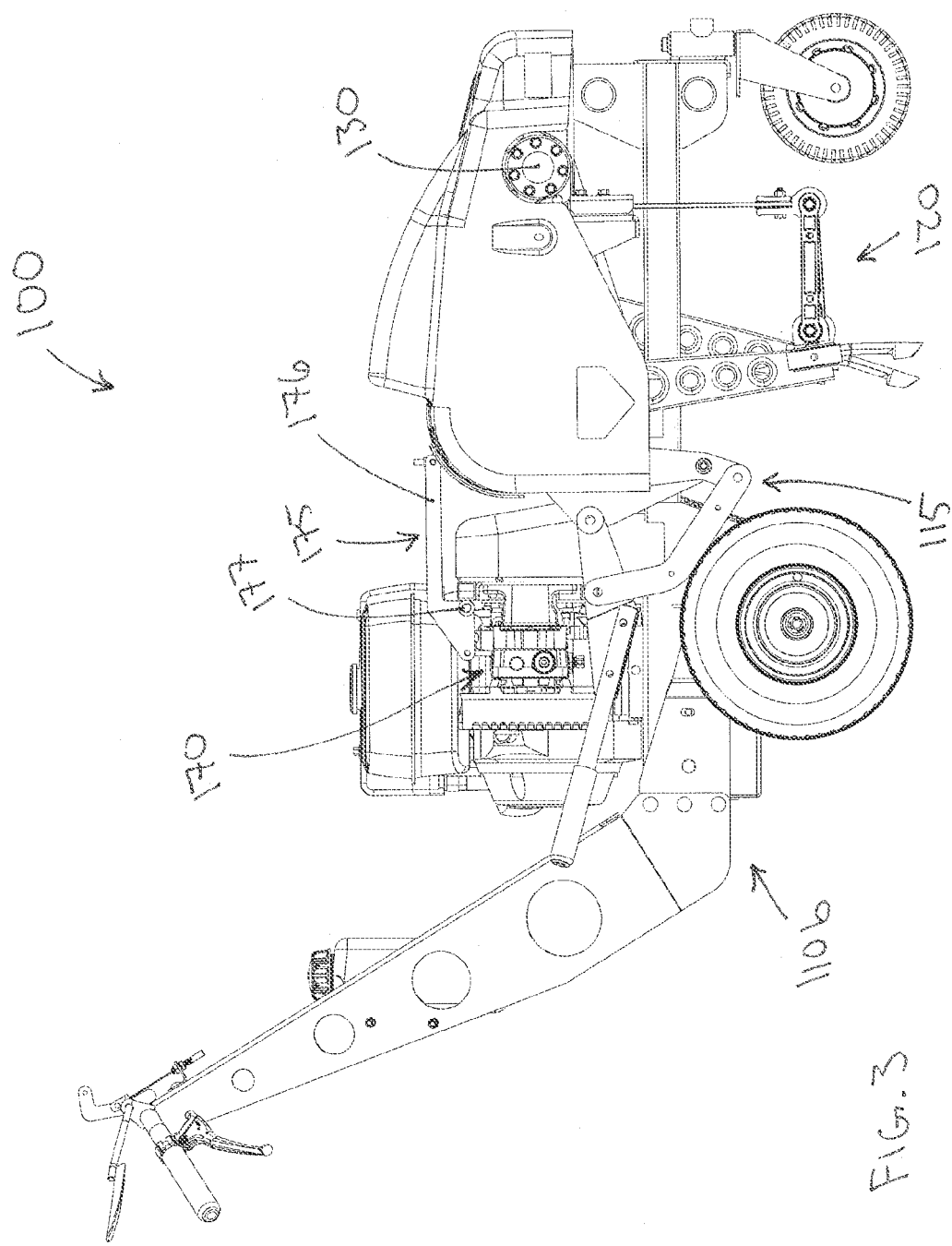
FIG. 3 is an opposite side view of the aerator of FIG. 1.
Figure 4:
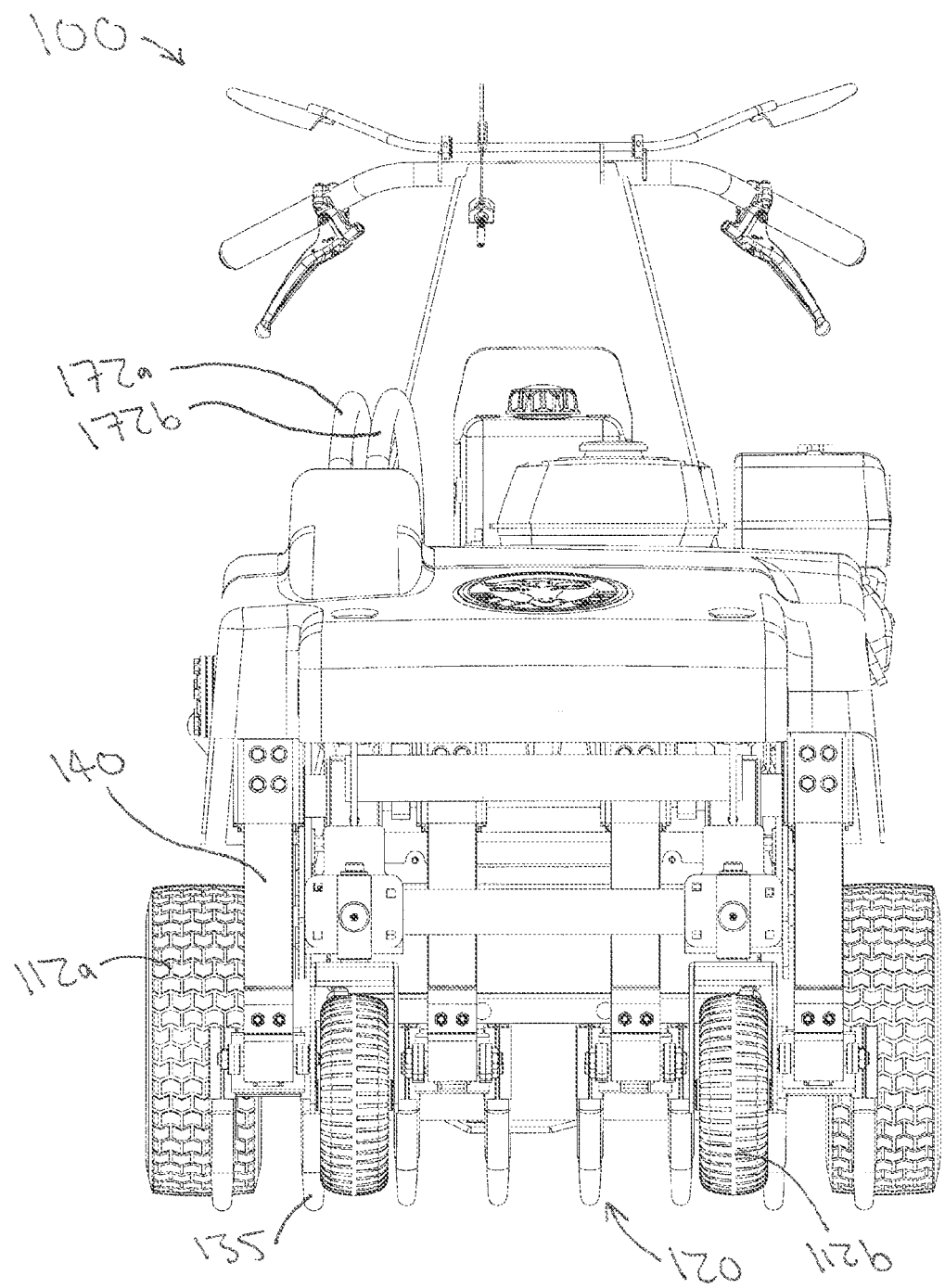
FIG. 4 is a front view of the aerator of FIG. 1.
Figure 5:
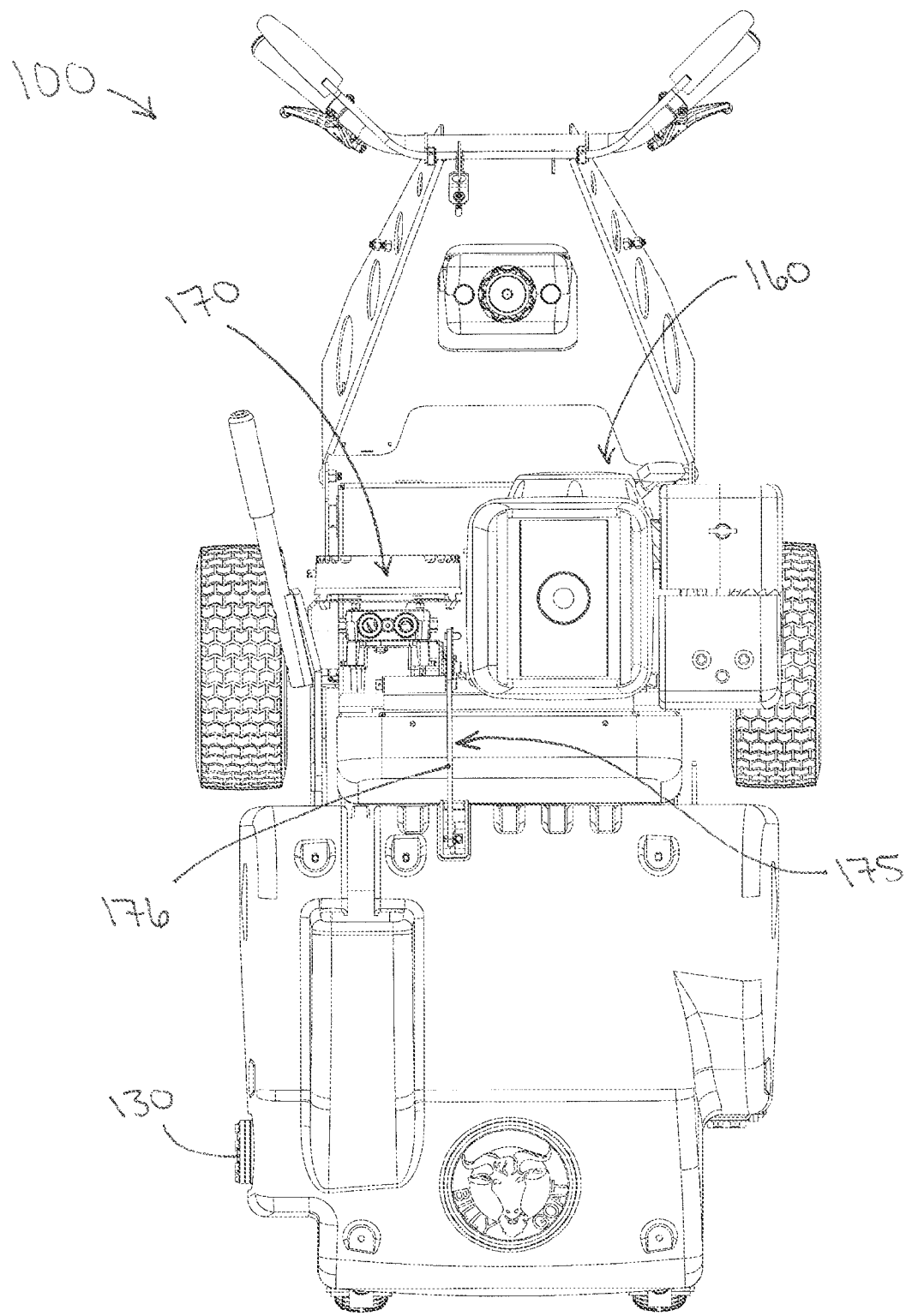
FIG. 5 is a top view of the aerator of FIG. 1.

FIGS. 1 through 17 show a turf aerator according to one embodiment 100 of the current invention. Reference numbers used to describe and illustrate the turf aerator 100 are independent from and used without respect to the reference numbers appearing in the Background section above.

The aerator 100 includes a frame 110 with front and rear ends 110a, 110b and a plurality of wheels 112 operatively coupled to the frame 110. Two rear wheels 112a and two front wheels 112b are shown in the drawings with the rear wheels 112a being mounted to a drive shaft 113 (FIG. 6), though more or fewer wheels 112 may of course be included and the front wheels 112b could instead (or additionally) be fixed to a drive shaft.

Figure 6:
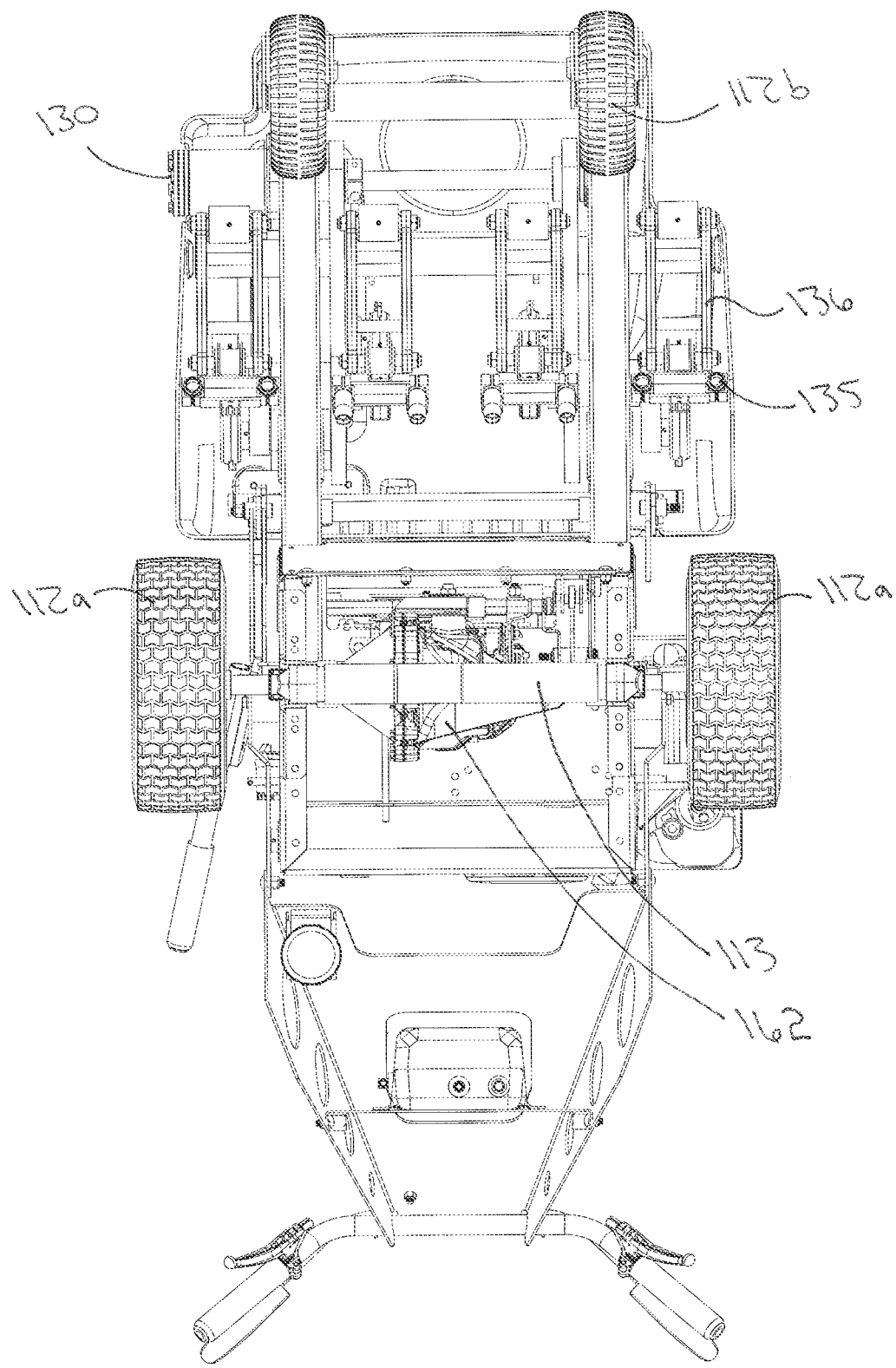
FIG. 6 is a bottom view of the aerator of FIG. 1.
Figure 7:
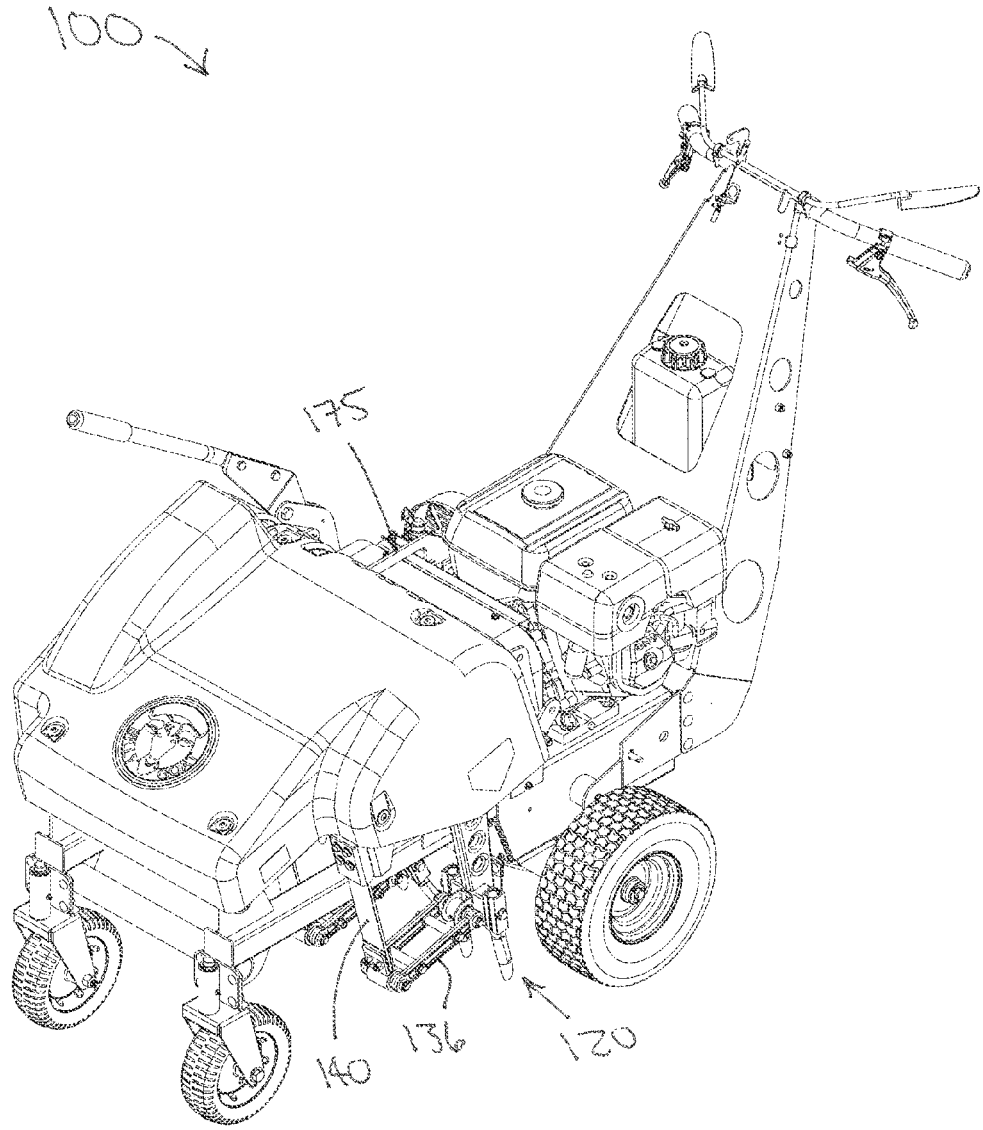
FIG. 7 is another perspective view of the aerator of FIG. 1, shown with the aerator's tine assembly at a raised configuration.
Figure 8:
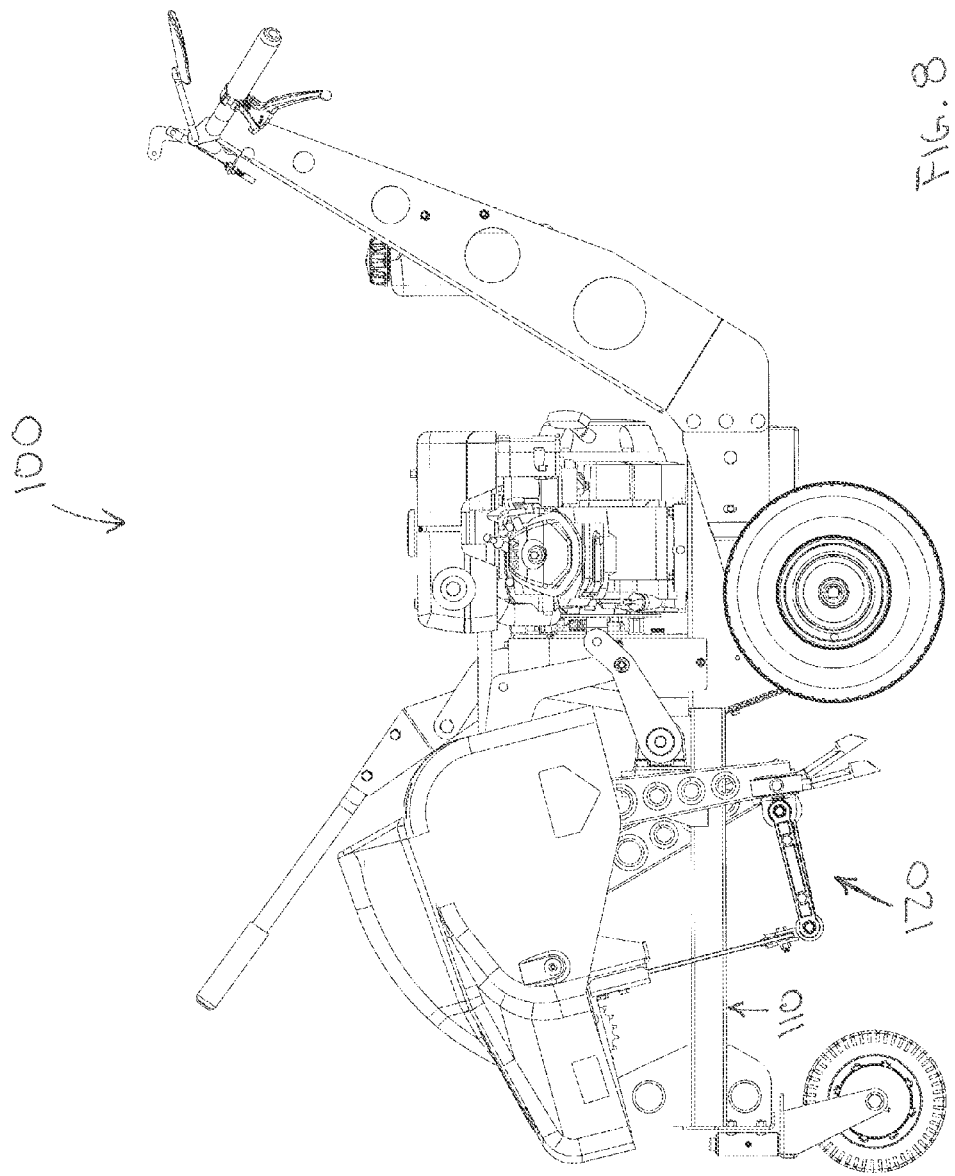
FIG. 8 is another side view of the aerator of FIG. 1, shown with the tine assembly at the raised configuration.
Figure 9:
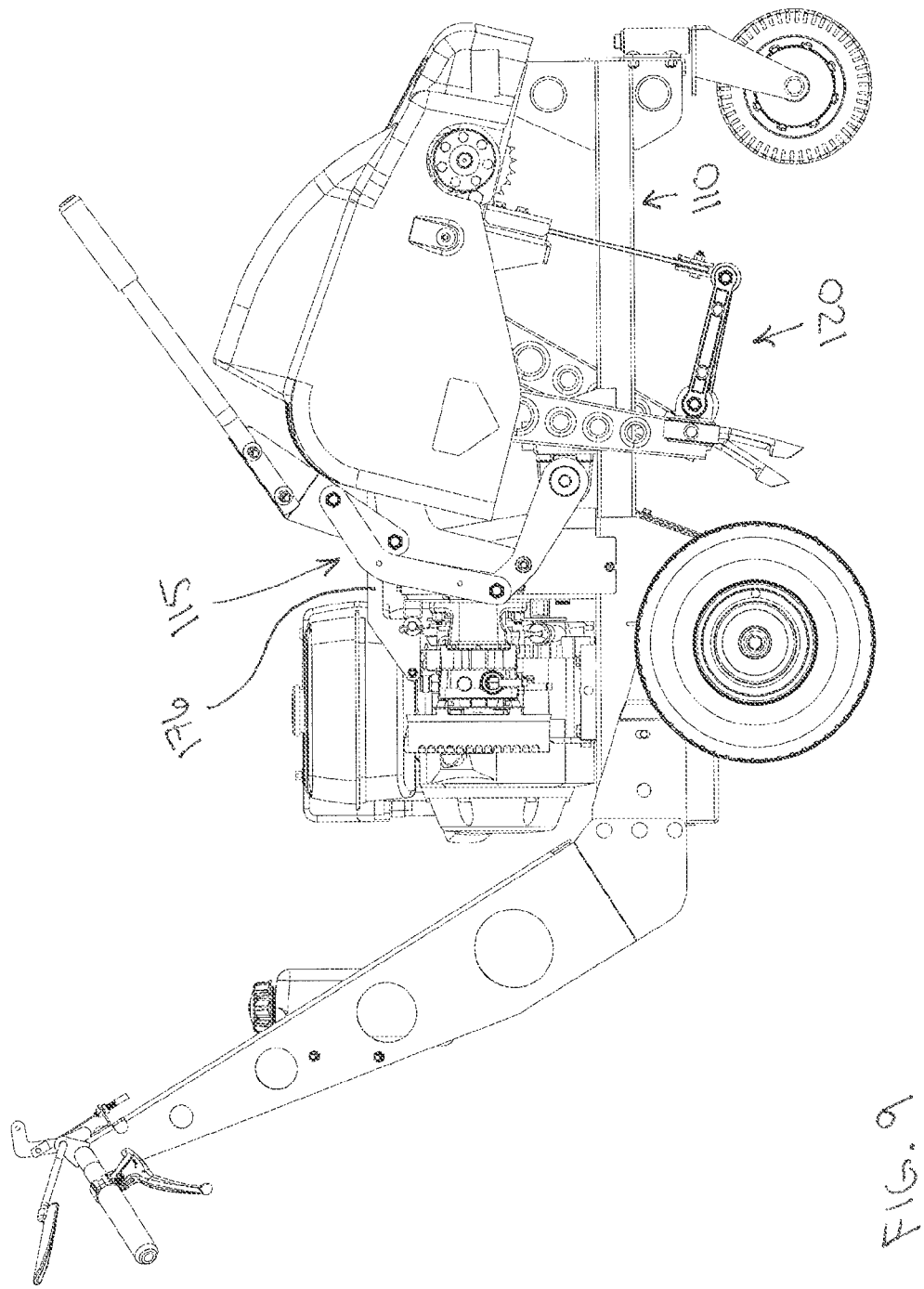
FIG. 9 is another opposite side view of the aerator of FIG. 1, shown with the tine assembly at the raised configuration.

An elevating tine assembly 120, best shown in FIGS. 10 through 15, is movable relative to the frame 110, allowing the tine assembly 120 to be selectively placed relatively near to, or distant from, the ground. While the tine assembly 120 may be coupled to the frame 110 in various ways, it is currently preferred that a forward end 120a of the tine assembly 120 is pivotally coupled to the frame 110 (e.g., at points 121a shown in FIGS. 10 through 12), and that a linkage 115 (FIG. 3) couples a rear end 121b of the tine assembly 120 to the frame 110 (e.g., at points 121b shown in FIGS. 10 through 12). As such, the tine assembly 120 may rotate upwardly or downwardly relative to the frame 110 using the linkage 115. FIGS. 1 through 6 show the tine assembly 120 at a lowered configuration, while FIGS. 7 through 9 show the tine assembly 120 at a raised configuration.

The tine assembly 120 includes a base 122 having support rails 124 extending from the tine assembly forward end 120a to the tine assembly rear end 120b and being coupled together by cross-members 125. A pair of driving pulleys or sprockets 126 and a pair of driven pulleys or sprockets 128 are operatively supported by the base 122, with the driving pulleys/sprockets 126 being more toward the forward end 120a than are the driven pulleys/sprockets 128. "Pulley" is used herein for convenience to generically refer to either a pulley or a sprocket. An axle 127 is fixed to both driving pulleys 126 to rotate the pulleys 126, each driven pulley 128 has a respective axle 129 to output rotational movement from the pulleys 128, and a respective belt or chain 123 (referred to generically herein simply as a belt) transfers power from the pulleys 126 to the pulleys 128. A hydraulic motor 130 selectively causes the axle 127 to rotate, as discussed in further detail below.

Two cranks 132 extend from each axle 129 with one crank 132 on each side of a respective driven pulley 128. Of the cranks 132, two outermost cranks 132a extend in generally the same direction from the respective axles 129, and two innermost cranks 132b extend in generally the opposite direction. A respective arm 134 is rotatably coupled to each crank 132 and extends downwardly therefrom, and coring tines 135 extend downwardly from each arm 134. A respective guide arm 136 is rotatably coupled to each arm 134, and each guide arm 136 is further rotatably coupled to a respective leaf or cantilever spring 140 (e.g., a flat metal spring or a composite spring) that is anchored to the base 122—here by bracket 142.

Attention is now directed to FIG. 1, which shows an engine or motor 160. While the embodiment 100 uses an engine 160, those skilled in the art will appreciate that an electric motor or any other device that creates sufficient rotational output, whether now known or later developed, may be used. The engine 160 rotates an output shaft which in turn is operationally coupled to the drive shaft 113 (FIG. 6). For example, a belt or chain (again, referred to generically herein simply as a belt) may transfer rotational movement from the engine 160 to a transmission 162 (FIG. 6), and the transmission 162 may rotate the drive shaft 113 using energy from the belt. By employing the transmission 162, the speed and direction at which the driven wheels 112 rotate—and thus the speed and direction at which the aerator 100 moves—may be easily altered by a user. A clutch device may be employed to allow transmission between the engine 160 and the belt to be selective.

The engine 160 further drives a pump 170. While different embodiments may incorporate different types of pumps that are placed in communication with the engine 160 in different ways (e.g., through multiple belts), the pump 170 in the aerator 100 is a variable displacement pump and interacts with the same belt that is in mechanical communication with the drive shaft 113. The pump 170 utilizes the rotational movement from the engine 160 to draw hydraulic fluid from inlet hose 172a and provide a desired amount of hydraulic pressure in hose 172b, as discussed in additional detail below.

Figure 10:
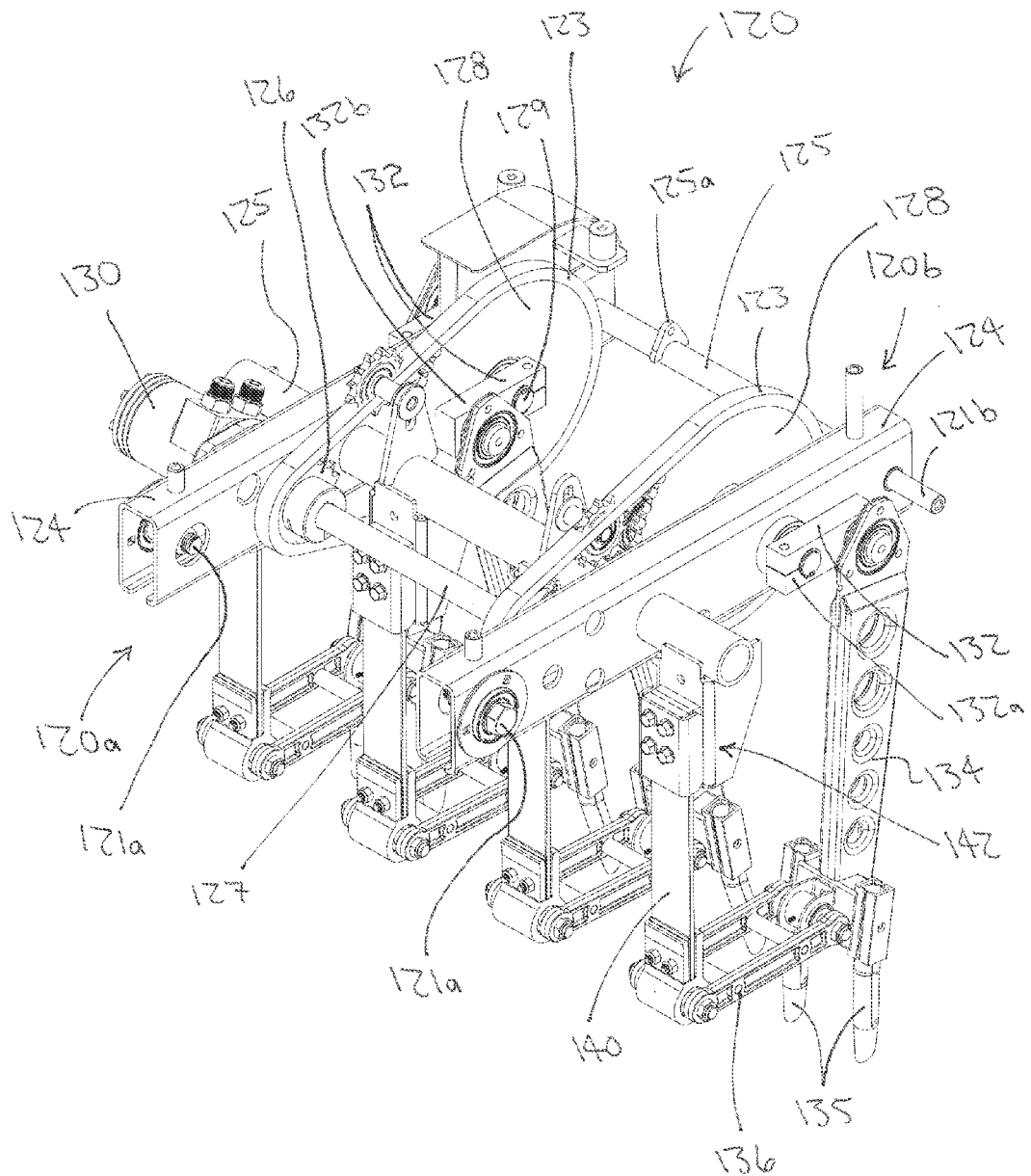
FIG. 10 is a perspective view of the tine assembly of the aerator of FIG. 1.
Figure 11:
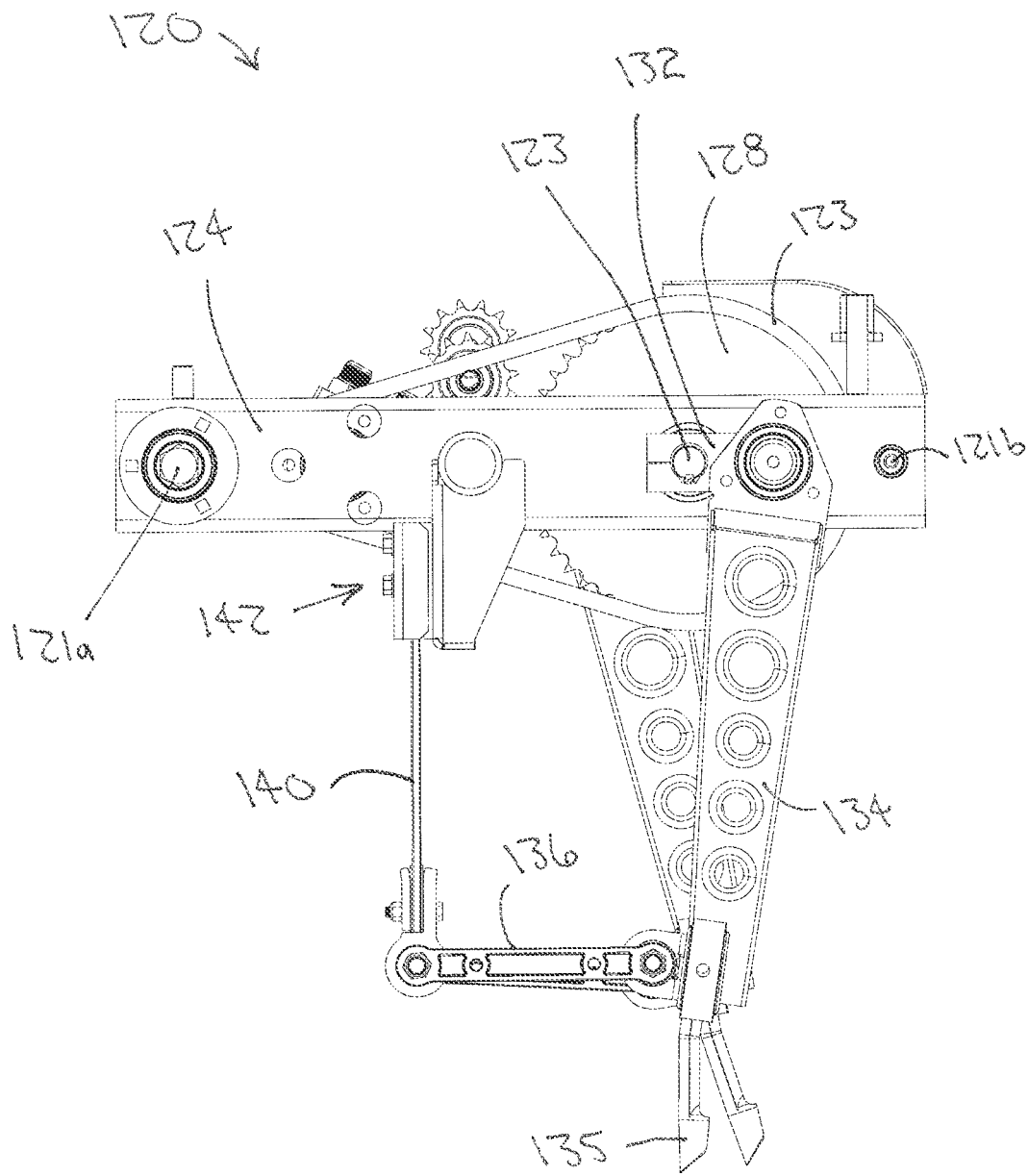
FIG. 11 is a side view of the tine assembly of FIG. 10.
Figure 12:
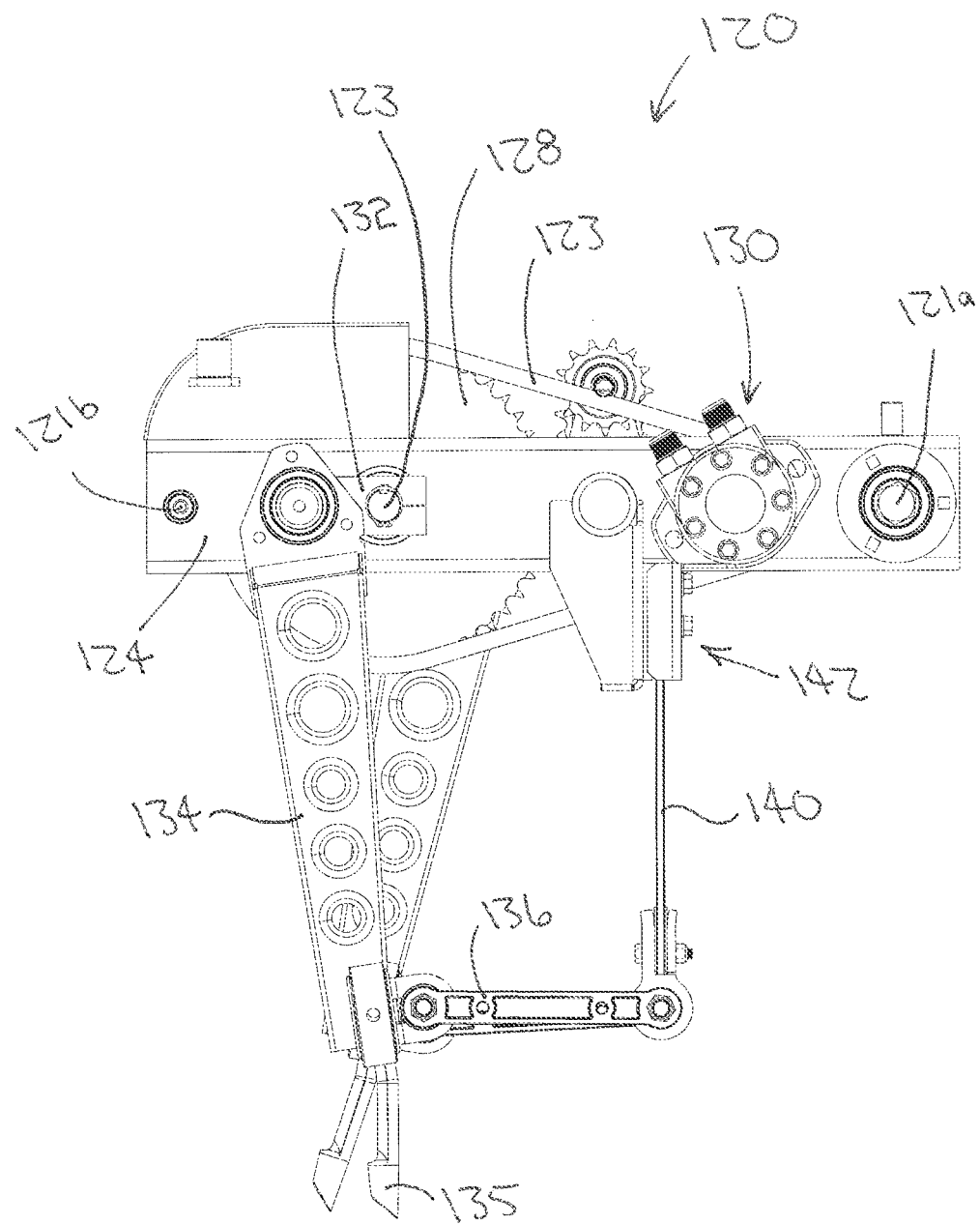
FIG. 12 is an opposite side view of the tine assembly of FIG. 10.
Figure 13:
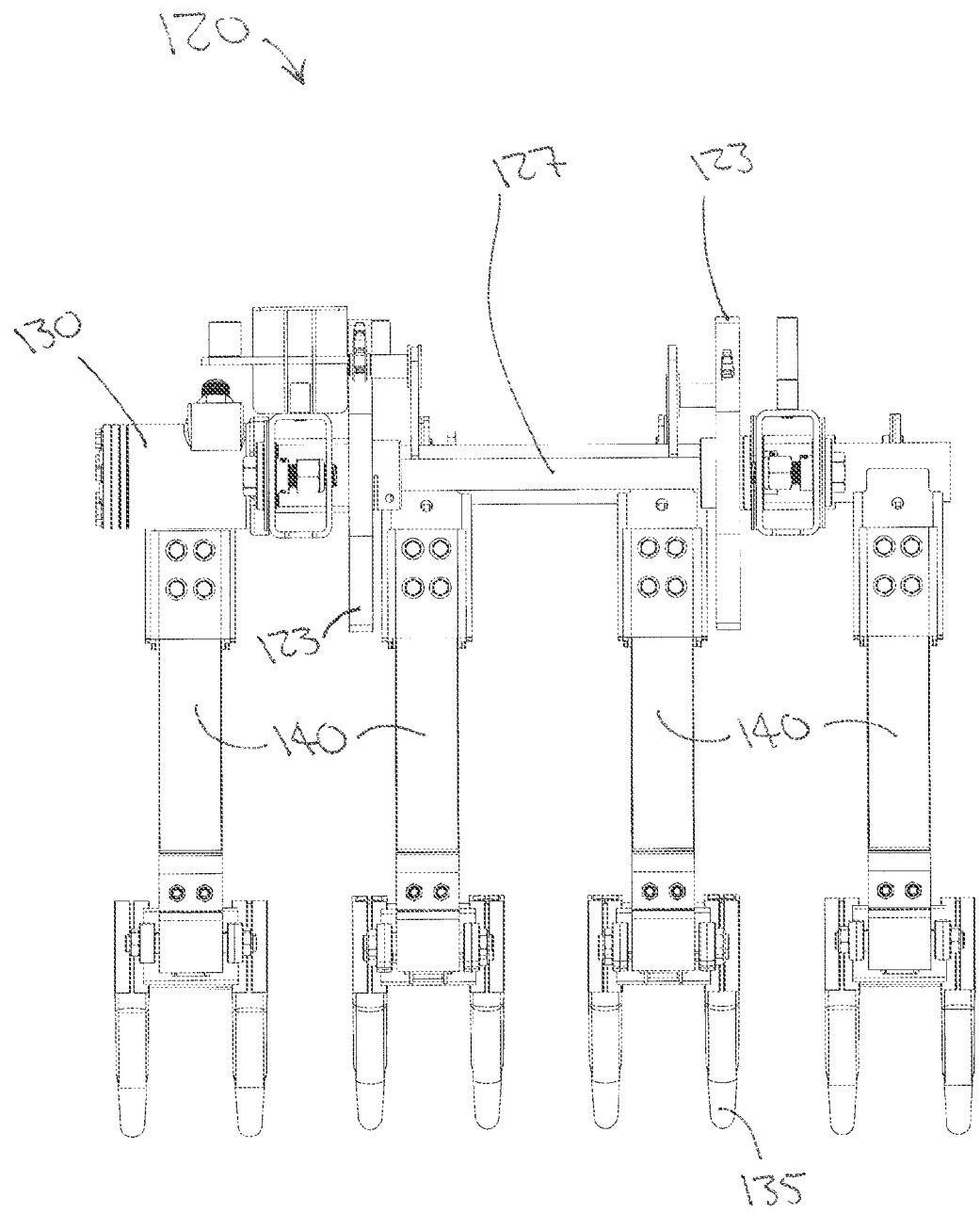
FIG. 13 is a front view of the tine assembly of FIG. 10.
Figure 14:
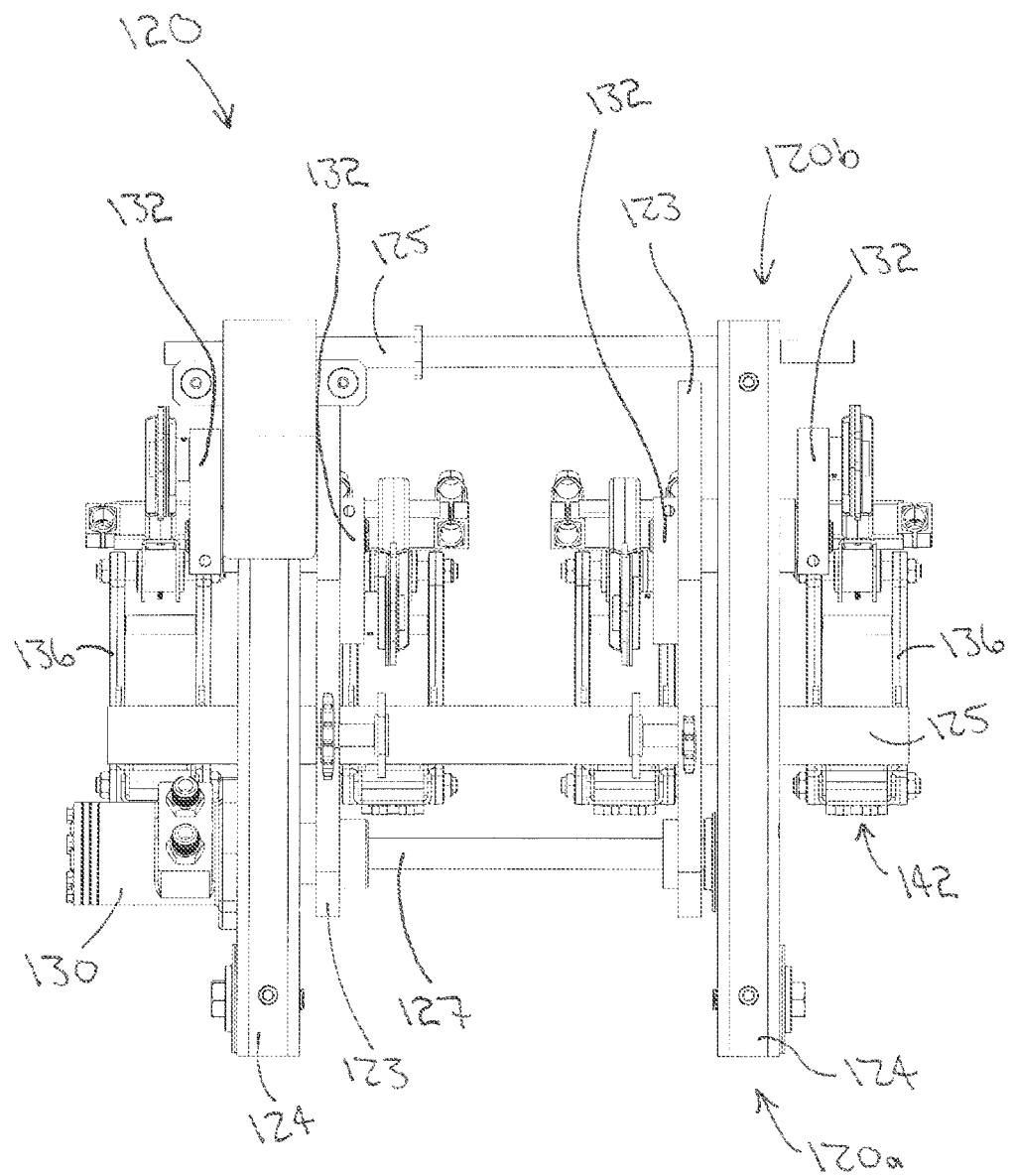
FIG. 14 is a top view of the tine assembly of FIG. 10.
Figure 15:
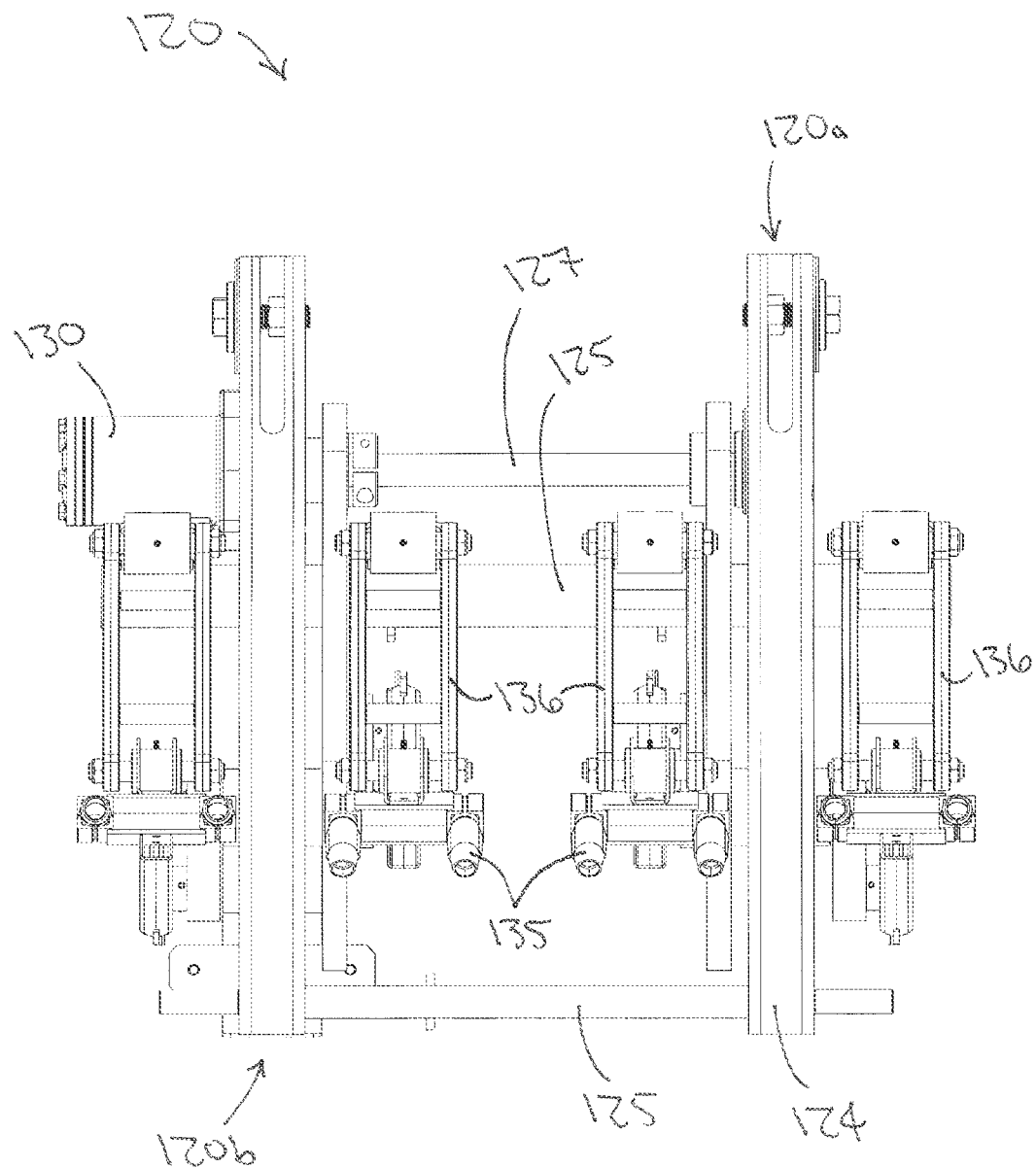
FIG. 15 is a bottom view of the tine assembly of FIG. 10.
Figure 16:
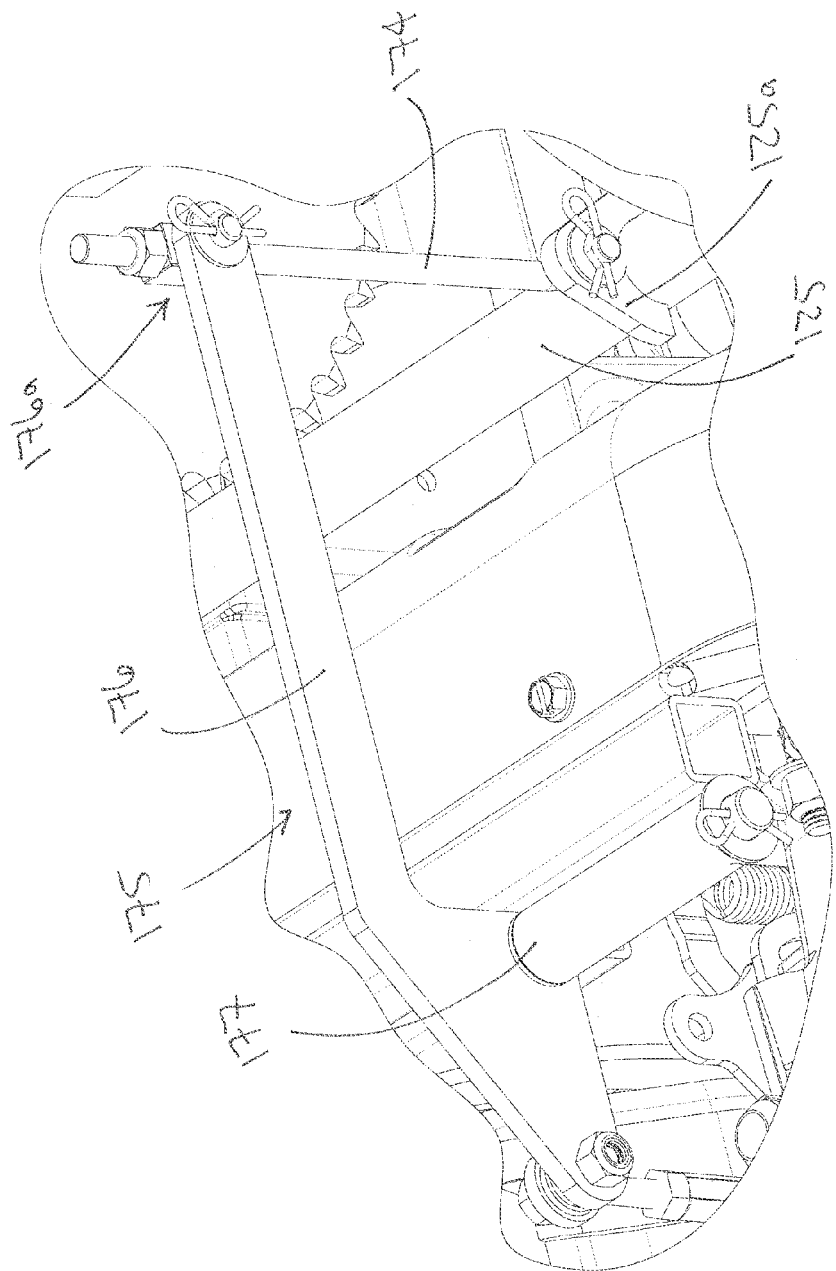
FIG. 16 is a perspective view of a swash-plate-adjustment linkage of the aerator of FIG. 1.
Figure 17:
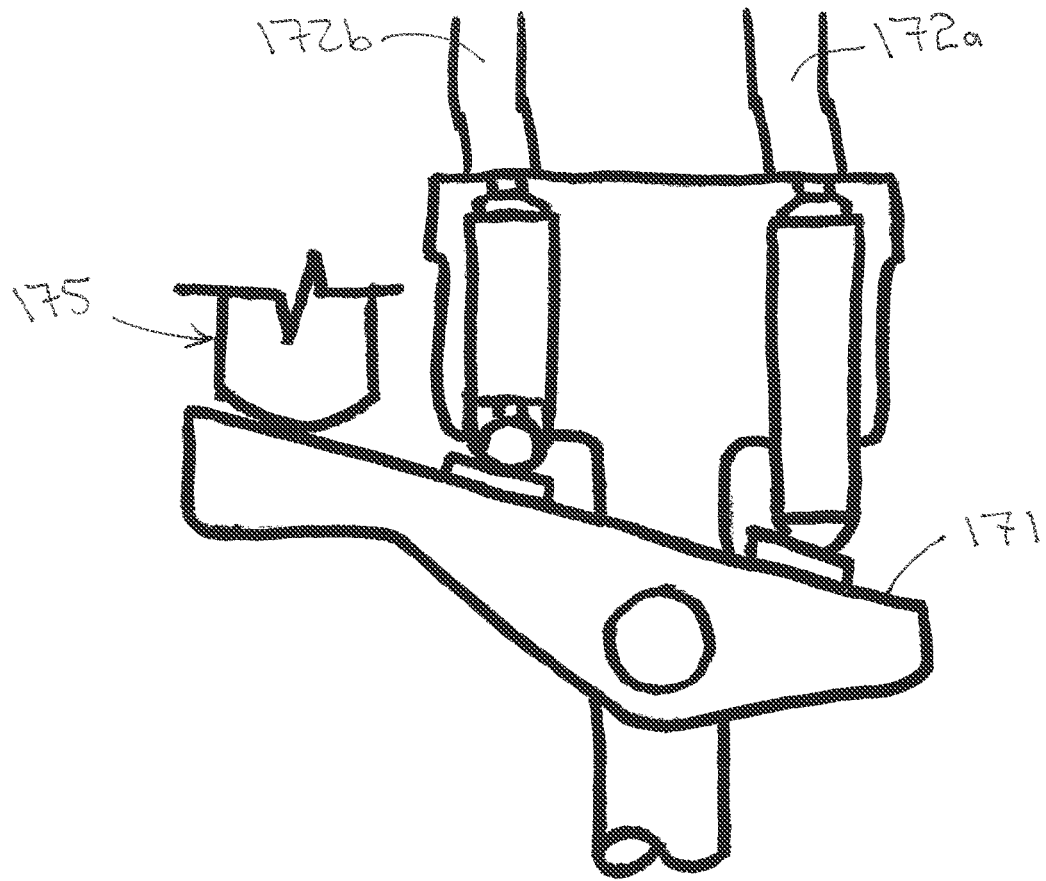
FIG. 17 is a diagram illustrating adjustment of a pump in the aerator of FIG. 1.

Swash-plate-adjustment linkage 175 extends from the tine assembly 120 (and particularly from bracket 125a on cross member 125, shown in FIGS. 10 and 16), and may for example include a first rotating arm 174 extending from and rotatable about the bracket 125a and a second rotating arm 176 rotatable about a pivot point 177 (FIGS. 3 and 16) and in communication with a swash plate 171 (FIG. 17) in the pump 170. A distal end 176a (FIG. 16) of the arm 176 is slidable relative to the arm 174, such that movement of the tine assembly 120 between the lowered and raised configurations alters an angular position of the arm 176 and accordingly the swash plate 171. The linkage 175 is configured to cause the swash plate 171 to be generally perpendicular to an input shaft of the pump 170 when the tine assembly 120 is at the raised configuration (causing the pump 170 to provide no output), and to be angled when the tine assembly 120 is at the lowered configuration (causing a desired amount of hydraulic pressure in hose 172b).

The aerator 100 is a "walk-behind" embodiment that includes a user interface having handle bars 182 and various user inputs 183 to control operation of the transmission 162 and clutch, for example. In other embodiments, the aerator may for example be remote-controlled, self-directing, or ridden, allowing the physical configuration of the user interface to substantially differ.

In use, the tine assembly 120 may for example begin at the raised configuration (FIGS. 7 through 9) and the clutch may be disengaged. The engine 160 may then be started, and the clutch may be engaged. With the clutch engaged, power may be transferred to the transmission 162 and the pump 170. Depending on the setting of the transmission 162, the drive shaft 113 may be rotated in a forward or reverse direction at a chosen speed, causing the aerator 100 to move. With the tine assembly 120 at the raised configuration, the tines 135 are generally stationary relative to the frame 110 since the swashplate-adjustment linkage 175 maintains the pump swash plate 171 at a neutral position.

With the clutch engaged and upon moving the tine assembly 120 to the lowered configuration (FIGS. 1 through 6) using the linkage 115, the linkage 175 causes the swash plate 171 to angle, drawing hydraulic fluid from the inlet hose 172a and providing a desired amount of hydraulic pressure in the hose 172b. This pressure in the hose 172b activates the hydraulic motor 130, which in turn rotates the axle 127 and the driving pulleys 126. The belts 123 transfer power from the driving pulleys 126 to the driven pulleys 128 and the axles 129, and rotation of the axles 129 causes the cranks 132 to rotate. Rotation of the cranks 132 causes the arms 134 to rise and fall, and the tines 135 may accordingly pierce and remove soil. The springs 140, via the guide arms 136, may automatically center the arms 134.

It may be particularly advantageous for the cranks 132 to rotate in a direction opposite the rotational direction of the drive shaft 113. Such counter-rotation forces the tines 135 to be presented to the soil in a direction with the travel of the aerator 100. In other words, with this counter-rotation, the tines 135 may naturally displace in a direction opposite of the aerator travel, allowing the aerator 100 to travel at higher ground speeds than prior art devices while maintaining effectiveness. If the rotational direction is the same (e.g., when the transmission is in reverse), it may be desirable to limit the speed of the drive shaft 113.

Because the operation of the tine assembly 120 is independent of the operation of the drive shaft 113, the hole density may be easily varied by adjusting the ground speed. More particularly, if the ground speed is increased, the hole density may decrease; and if the ground speed is decreased, the hole density may increase. This variation in hole density may be highly advantageous over prior art devices which directly tie ground speed to tine operation. However, the independent relationship between ground speed and tine operation may cause substantial, undesired forward and rearward variation in displacement of the arms 134 if unchecked. While the prior art stops may be ill-suited to address this variation and also the ground speeds that may be achieved with the aerator 100, the springs 140 may be particularly effective—and especially when combined with the counter-rotation discussed above. When combined with the counter-rotation feature, the displacement of the springs 140 may be generally uniform and relatively minimal even at fast ground speeds; without the counter-rotation feature, the displacement of the springs 140 may be out of sync and relatively large.

To prevent the tines 135 from operating, the linkage 115 may be used to move the tine assembly 120 to the raised configuration (FIGS. 7 through 9), and the linkage 175 automatically causes the swash plate 171 to return to the neutral position. Notably, the user interface does not require an additional input (e.g., lever) to disengage the tines 135. With the swash plate 171 at the neutral position, the pump 170 is prevented from pressurizing the fluid in the hose 172b and the hydraulic motor 130 is automatically deactivated without further user input. The drive shaft 113 may nevertheless be operated to move the aerator 100 even when the tines 135 are at rest.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. Various steps in described methods may be undertaken simultaneously or in other orders than specifically provided.

I claim:

1. A turf aerator, comprising:
a frame having a plurality of wheels;
a variable displacement pump;
an engine for driving at least one of the wheels and driving the pump;
a tine assembly supported by the frame and being movable relative to the frame between lowered and raised configurations, the tine assembly comprising:
 (a) a base;
 (b) a hydraulic motor in hydraulic communication with the pump;
 (c) a plurality of rotatable cranks;
 (d) means for transferring rotational motion from the hydraulic motor to the cranks;
 (e) a downwardly-extending arm rotatably coupled to each crank;
 (f) a tine extending downwardly from each downwardly-extending arm;
 (g) a plurality of springs operatively anchored to the base; and
 (h) a guide arm extending between each downwardly-extending arm and a respective spring; and
a swash-plate-adjustment linkage extending from the tine assembly to the pump, the swash-plate-adjustment linkage automatically adjusting the pump with movement of the tine assembly relative to the frame to provide output to the hydraulic motor substantially only when the tine assembly is at the lowered configuration.

2. The turf aerator of claim 1, wherein the swash-plate-adjustment linkage automatically adjusts the pump by interacting with a swash plate in the pump.

3. The turf aerator of claim 1, wherein the means for transferring rotational motion from the hydraulic motor to the cranks includes sprockets and chains or pulleys and belts.

4. The turf aerator of claim 1, wherein:
the wheels are rotatable in a forward direction and a reverse direction; and
the cranks rotate in the reverse direction when the wheels rotate in the forward direction.

5. The turf aerator of claim 4, wherein:
the swash-plate-adjustment linkage automatically adjusts the pump by interacting with a swash plate in the pump; and
the means for transferring rotational motion from the hydraulic motor to the cranks includes sprockets and chains or pulleys and belts.

6. The turf aerator of claim 5, wherein the cranks rotate at a speed that is independent of wheel rotation speed.

7. The turf aerator of claim 1, wherein the cranks rotate at a speed that is independent of wheel rotation speed.

8. A turf aerator, comprising:
a frame having a plurality of wheels;
a variable displacement pump;
means for outputting a rotation to drive at least one of the wheels and drive the pump;
a tine assembly supported by the frame and being movable relative to the frame between lowered and raised configurations, the tine assembly comprising:
 (a) a base;
 (b) a hydraulic motor in hydraulic communication with the pump;
 (c) a plurality of rotatable cranks;
 (d) means for transferring rotational motion from the hydraulic motor to the cranks;
 (e) a downwardly-extending arm rotatably coupled to each crank; and
 (f) a tine extending downwardly from each downwardly-extending arm; and
a swash-plate-adjustment linkage extending from the tine assembly to the pump; the swash-plate-adjustment linkage automatically adjusting the pump with movement of the tine assembly relative to the frame to provide output to the hydraulic motor substantially only when the tine assembly is at the lowered configuration, whereby movement of the tine assembly from the lowered configuration to the raised configuration causes the rotatable cranks to stop rotating without further user input.

9. The turf aerator of claim 8, wherein the swash-plate-adjustment linkage automatically adjusts the pump by interacting with a swash plate in the pump.

10. The turf aerator of claim 9, wherein:
   the wheels are rotatable in a forward direction and a reverse direction; and
   when the wheels rotate in the forward direction and the cranks rotate, the cranks rotate in a reverse direction.

11. The turf aerator of claim 10, wherein the cranks rotate at a speed that is independent of wheel rotation speed.

12. The turf aerator of claim 11, wherein:
   the means for outputting a rotation is an engine or a motor; and
   the means for transferring rotational motion from the hydraulic motor to the cranks includes sprockets and chains or pulleys and belts.

13. The turf aerator of claim 12, wherein the tine assembly further comprises:
   a plurality of springs operatively anchored to the base; and
   a guide arm extending between each downwardly-extending arm and a respective spring.

14. The turf aerator of claim 13, further comprising handlebars.

15. The turf aerator of claim 8, wherein the tine assembly further comprises:
   a plurality of springs operatively anchored to the base; and
   a guide arm extending between each downwardly-extending arm and a respective spring.

* * * * *